United States Patent
Negita (10) Patent No.: US 8,079,720 B2
(45) Date of Patent: Dec. 20, 2011

(54) MIRROR DRIVE APPARATUS AND IMAGING APPARATUS

(75) Inventor: Masahiro Negita, Aichi (JP)

(73) Assignee: Sony Corporation, Tokyo (JP)

( * ) Notice: Subject to any disclaimer, the term of this patent is extended or adjusted under 35 U.S.C. 154(b) by 368 days.

(21) Appl. No.: 12/385,801

(22) Filed: Apr. 21, 2009

(65) Prior Publication Data

US 2009/0296180 A1 Dec. 3, 2009

(30) Foreign Application Priority Data

May 29, 2008 (JP) ................................ 2008-140852

(51) Int. Cl.
*G02B 7/182* (2006.01)
(52) U.S. Cl. ....................................................... 359/877
(58) Field of Classification Search .................. 359/841, 359/871, 872, 877
See application file for complete search history.

(56) References Cited

U.S. PATENT DOCUMENTS

| 6,844,966 B2 * | 1/2005 | Kho et al. ...................... 359/877 |
| 2007/0153407 A1 * | 7/2007 | Griffin et al. .................. 359/877 |

FOREIGN PATENT DOCUMENTS

| JP | 09-274250 | 10/1997 |
| JP | 09-281596 A | 10/1997 |

OTHER PUBLICATIONS

Japanese Office Action issued Feb. 2, 2010 for corresponding Japanese Application No. 2008-140852.

* cited by examiner

*Primary Examiner* — Euncha Cherry
(74) *Attorney, Agent, or Firm* — Rader, Fishman & Grauer PLLC (57) ABSTRACT

A mirror drive apparatus includes: a movable unit including a mirror used to switch an optical path in an imaging apparatus; and a drive mechanism that switches the attitude of the movable unit from a first attitude to a second attitude by relatively moving a specific member along a predetermined section defined by an edge of the movable unit from a start point to an end point of the predetermined section, wherein the movable unit includes a protrusion that protrudes from an extension line toward the specific member, the extension line obtained by extending the predetermined section beyond the end point.

5 Claims, 8 Drawing Sheets

MIRROR DRIVE APPARATUS AND IMAGING APPARATUS

BACKGROUND OF THE INVENTION

1. Field of the Invention

The present invention relates to a technology of a mirror drive apparatus including a movable unit with a mirror provided therein and used to switch an optical path.

2. Description of the Related Art

A single-lens reflex camera (imaging apparatus) typically includes a mirror box (mirror drive apparatus) configured as what is called a quick-return mirror insertable and retractable to and from the optical path of an imaging lens. The mirror box includes a primary mirror holder with a primary mirror provided therein and a secondary mirror holder with a secondary mirror provided therein, the primary and secondary mirror holders capable of changing their positions between an inserted position in which the primary and secondary mirrors are inserted to the optical path and a retracted position in which the primary and secondary mirrors are retracted from the optical path. Each of the mirror holders is positioned in the inserted position when one side of the mirror holder abuts a stopper (positioning member).

When the secondary mirror in the retracted position is driven and shifted to the inserted position, the secondary mirror holder hits the stopper and is brought to an abrupt halt, which disadvantageously causes the secondary mirror holder to vibrate. Not until the vibration subsides, for example, can a phase-difference AF sensor that receives subject light reflected off the secondary mirror detect the focus (measure the distance) in a precise manner.

JP-A-9-274250, for example, discloses a technology for reducing the vibration of the secondary mirror holder described above. The disclosed technology prevents the secondary mirror holder from vibrating by sandwiching the secondary mirror holder in the inserted position with a pair of pins that serve as the stopper.

SUMMARY OF THE INVENTION

In the technology described in JP-A-9-274250, however, a pair of pins is necessary to prevent the secondary mirror holder from vibrating, and the configuration becomes complicated accordingly.

Further, since the pair of pins sandwich one side of the secondary mirror holder, the other end of the secondary mirror holder that is not sandwiched between the pins disadvantageously vibrates due to deformation produced when the secondary mirror holder reaches the inserted position.

Thus, it is desirable to provide a technology of a simply configured mirror drive apparatus capable of quickly attenuating the vibration of a mirror produced when the mirror is driven and positioned in a predetermined attitude.

An embodiment of the invention is directed to a mirror drive apparatus including a movable unit including a mirror used to switch an optical path in an imaging apparatus, and a drive mechanism that switches the attitude of the movable unit from a first attitude to a second attitude by relatively moving a specific member along a predetermined section defined by an edge of the movable unit from a start point to an end point of the predetermined section. The movable unit includes a protrusion that protrudes from an extension line toward the specific member, the extension line obtained by extending the predetermined section beyond the end point.

The embodiment of the invention includes the drive mechanism that switches the attitude of a movable unit including a mirror used to switch an optical path from a first attitude to a second attitude by relatively moving a specific member along a predetermined section defined by an edge of the movable unit from a start point to an end point of the predetermined section, and the movable unit includes a protrusion that protrudes from an extension line toward the specific member, the extension line obtained by extending the predetermined section beyond the end point. As a result, the vibration of the mirror produced when the mirror is driven and positioned in a predetermined attitude can be quickly attenuated by a simple configuration.

DESCRIPTION OF THE PREFERRED EMBODIMENTS

External Configuration of Imaging Apparatus

Figure 1:
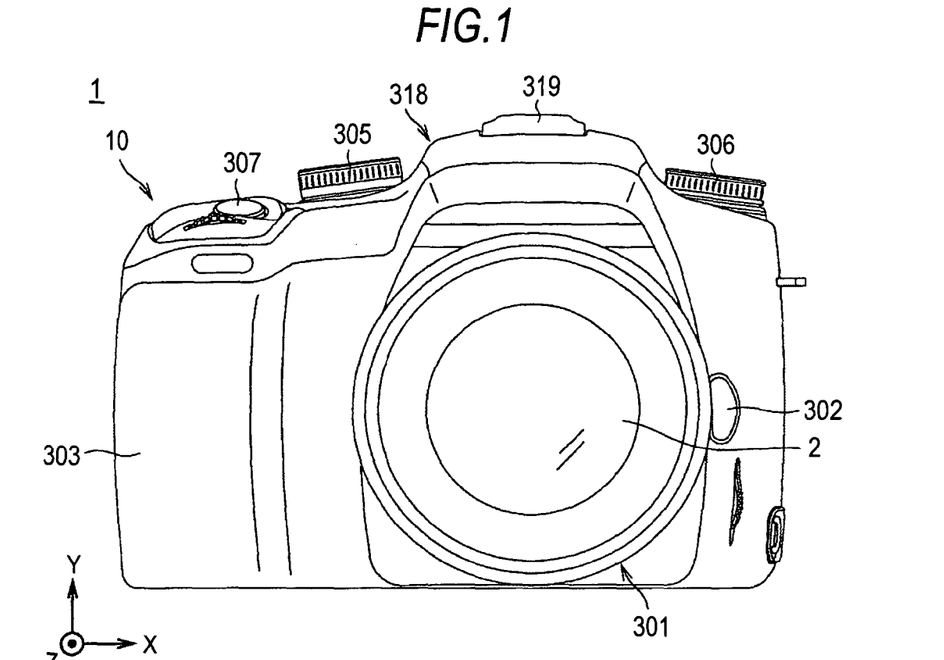
FIG. 1 shows the external configuration of an imaging apparatus 1 according to an embodiment of the invention.
Figure 2:
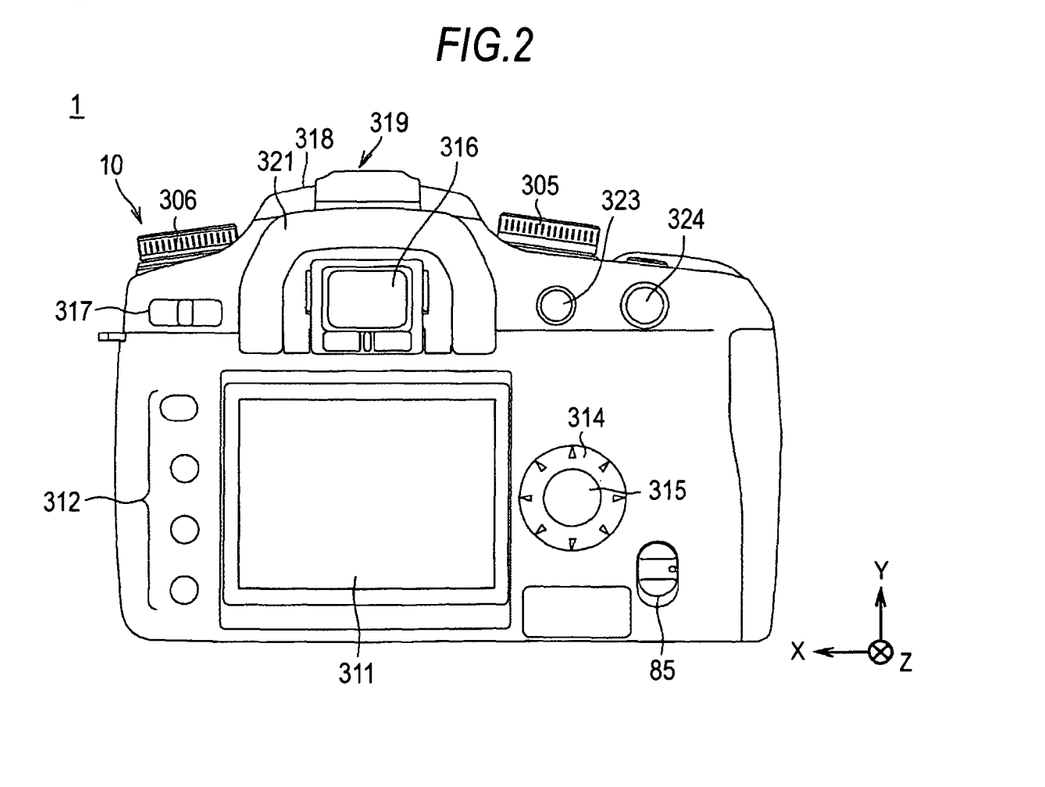
FIG. 2 shows the external configuration of the imaging apparatus 1.

FIGS. 1 and 2 show the external configuration of an imaging apparatus 1 according to an embodiment of the invention. FIG. 1 is a front view, and FIG. 2 is a rear view.

The imaging apparatus 1 is configured, for example, as a single-lens reflex digital still camera and includes a camera body 10 and an interchangeable lens 2 as an imaging lens that can be attached and detached to and from the camera body 10.

FIG. 1 shows the following components provided on the front side of the camera body 10: a mount 301 that is disposed in a substantially central portion of the front side and to which the interchangeable lens 2 is attached, a lens interchanging button 302 disposed to the right of the mount 301, and a grip 303 where the camera body 10 can be gripped. The camera body 10 further includes a mode setting dial 305 disposed in an upper left portion when viewed from the front, a control value setting dial 306 disposed in an upper right portion when viewed from the front, and a shutter button 307 disposed on the upper side of the grip 303.

FIG. 2 shows the following components provided on the rear side of the camera body 10: an LCD (Liquid Crystal Display) 311, a group of setting buttons 312 disposed to the left of the LCD 311, a cross-shaped key 314 disposed to the right of the LCD 311, a push button 315 disposed at the center of the cross-shaped key 314, an optical finder 316 disposed above the LCD 311, an eye cup 321 that surrounds the optical finder 316, a main switch 317 disposed to the left of the optical finder 316, an exposure correction button 323 and an AE lock button 324 disposed to the right of the optical finder 316, and a flashlight 318 and a connection terminal 319 disposed above the optical finder 316.

The mount 301 has a connector for electrically connecting the mount 301 to the attached interchangeable lens 2 and a coupler for mechanically connecting the two components.

The lens interchanging button 302 is pushed down to remove the interchangeable lens 2 attached to the mount 301.

The grip 303 is the portion where a user grips the imaging apparatus 1 during imaging. The surface of the grip 303 is corrugated to match the shape of fingers so that the fingers fit with the grip 303 more comfortably. The grip 303 has a battery compartment and a card compartment (not shown) provided therein. The battery compartment houses a battery as a power source of the camera, and the card compartment detachably houses a memory card for recording image data of captured images. The grip 303 may include a grip sensor for detecting whether or not the user grips the grip 303.

Each of the mode setting dial 305 and the control value setting dial 306 includes a substantially disc-shaped member rotatable in a plane substantially parallel to the upper surface of the camera body 10. The mode setting dial 305 is provided to select any one of the modes and functions provided in the imaging apparatus 1, such as an auto-exposure (AE) control mode, an autofocus (AF) control mode, a variety of imaging modes including a still image capture mode for capturing a single still image and a continuous imaging mode for continuously capturing images, and a reproducing mode for reproducing recorded images. The control value setting dial 306 is provided to set control values used in the variety of functions provided in the imaging apparatus 1.

The shutter button 307 is a push-down switch that allows two operation states, a "half-pressed state" in which the shutter button 307 is pressed halfway and a "fully-pressed state" in which the shutter button 307 is further pressed. When the shutter button 307 is pressed halfway in the still image capture mode, preparation actions for capturing a still image of a subject (preparation actions, such as setting an exposure control value and detecting the focus) are carried out. When the shutter button 307 is fully pressed, imaging actions (a series of actions including exposing an imaging device 101 (see FIG. 3) to light, performing predetermined image processing on an image signal obtained by the exposure action, and recording the resultant image signal in the memory card) are carried out.

The LCD 311 includes a color liquid crystal panel capable of displaying an image. The LCD 311 not only displays an image captured by the imaging device 101 (see FIG. 3) and reproduces and displays a recorded image, but also displays a setting screen for setting the functions and modes provided in the imaging apparatus 1. The LCD 311 may be replaced with an organic EL display or a plasma display.

The group of setting buttons 312 are provided to operate the variety of functions provided in the imaging apparatus 1. The group of setting buttons 312 include, for example, a selection acceptance switch for accepting the operation selected in a menu screen displayed on the LCD 311, a selection cancel switch, a menu display switch for switching the operation displayed in the menu screen, a display on/off switch, and a display enlarging switch.

The cross-shaped key 314 has an annular member including a plurality of pressing portions disposed at equal spacings in the circumferential direction (the portions indicated by the triangular marks in FIG. 2), and contacts (switches) (not shown) provided in correspondence with the pressing portions detect pressing operations on the respective pressing portions. The push button 315 is disposed at the center of the cross-shaped key 314. The cross-shaped key 314 and the push button 315 are provided to input instructions, such as changing the imaging magnification (moving a zoom lens toward a wide angle side or a telescopic side), advancing frames of stored images to be reproduced on the LCD 311 or any other monitor, and setting imaging conditions (such as the aperture setting, shutter speed, and flashlight activation).

The optical finder 316 optically displays the area in which a subject is imaged. That is, an image of the subject is guided through the interchangeable lens 2 to the optical finder 316, and the user looks into the optical finder 316 to visually recognize the subject to be actually imaged by the imaging device 101.

The main switch 317 includes a two-contact slidable switch that slides sideways. When the main switch 317 is set to the left contact, the imaging apparatus 1 is turned on, whereas when the main switch 317 is set to the right contact, the imaging apparatus 1 is turned off.

The flashlight 318 includes a popup-type, built-in flashlight. On the other hand, an external flashlight or any other component is attached to the camera body 10 by using the connection terminal 319.

The eye cup 321 is a U-shaped, light-blocking member that prevents external light from entering the optical finder 316.

The exposure correction button 323 is provided to manually adjust the exposure setting (aperture setting and shutter speed). The AE lock button 324 is provided to lock the exposure conditions.

The interchangeable lens 2 functions as not only a lens window through which the light from a subject (optical image) passes but also an imaging optical system for guiding the subject light to the imaging device 101 disposed in the camera body 10. The interchangeable lens 2 can be detached from the camera body 10 by pressing down the lens interchanging button 302 described above.

Figure 3:
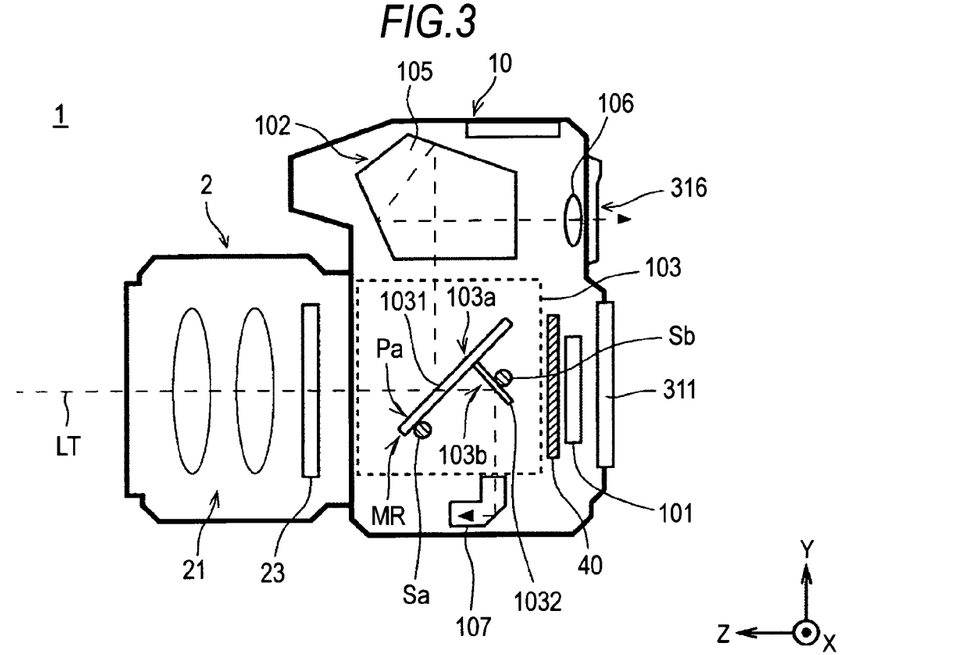
FIG. 3 is a longitudinal cross-sectional view of the imaging apparatus 1.

The interchangeable lens 2 includes a lens group 21 including a plurality of lenses disposed in series along an optical axis LT (see FIG. 3). The lens group 21 includes a focus lens for adjusting the focus and a zoom lens for changing the magnification. Moving the focus lens and the zoom lens along the optical axis LT (see FIG. 3) allows the magnification to be changed and the focus to be adjusted, respectively. The interchangeable lens 2 further includes an operation ring provided in an appropriate outer circumferential portion of a lens barrel of the interchangeable lens 2, and the operation ring is rotatable in the circumferential direction of the lens barrel. The zoom lens moves in the optical axis direction in accordance with the direction and amount of rotation of the operation ring to set a zoom magnification (imaging magnification) manually or automatically according to the position to which the zoom lens has moved.

Internal Configuration of Imaging Apparatus 1

The internal configuration of the imaging apparatus 1 will be described below. FIG. 3 is a longitudinal cross-sectional view of the imaging apparatus 1. As shown in FIG. 3, the camera body 10 houses the imaging device 101, a finder 102 (finder optical system), a mirror box (mirror drive apparatus) 103, and a phase-difference AF module 107. FIG. 3 shows a simplified form of a primary mirror holder 1031 and a secondary mirror holder 1032, which will be described later, for convenience of illustration.

The imaging device 101 is disposed on the optical axis LT of the lens group, which forms the interchangeable lens 2 attached to the camera body 10, in such a way that the imaging device 101 intersects the optical axis LT at right angles. The imaging device 101 is, for example, a CMOS color area sensor (CMOS-type imaging device) in which a plurality of pixels, each of which being a photodiode, are arranged two-dimensionally in a matrix. The imaging device 101 produces analog electric signals (image signals) for R (red), G (green), and B (blue) components contained in the subject light beam received through the interchangeable lens 2, and outputs the electric signals as R, G, and B image signals.

The mirror box 103 (indicated by the broken line) is fixed to the camera body 10 in a position on the optical axis LT where the subject light is reflected toward the finder 102. The subject light having passed through the interchangeable lens 2 is reflected upward off a primary mirror 103a in the mirror box 103. Part of the subject light having passed through the interchangeable lens 2 passes through the primary mirror 103a.

The finder 102 includes a pentaprism 105, an ocular lens 106, and the optical finder 316. The pentaprism 105 has a pentagonal cross-sectional shape and reverses the subject optical image, which is incident through the lower surface of the pentaprism 105, in the horizontal and vertical directions into an erect image by using internal reflection. The ocular lens 106 guides the subject image, which has been converted into an erect image in the pentaprism 105, out of the optical finder 316. The thus configured finder 102 functions as a finder for checking the field to be imaged during an imaging standby period before a final image is captured.

The mirror box 103 houses a drivable mirror unit MR including the primary mirror holder 1031 that hold the primary mirror 103a and the secondary mirror holder 1032 that holds a secondary mirror 103b. The mirror unit MR can take an attitude in which the secondary mirror 103b, which is disposed on the backside of the primary mirror holder 1031, appears to fall toward the backside of the primary mirror holder 1031, as shown in FIG. 3. When the mirror unit MR takes the attitude Pa shown in FIG. 3 (hereinafter sometimes referred to as a "mirror-down attitude"), part of the subject light having passed through the primary mirror 103a is reflected off the secondary mirror 103b, and the reflected subject light is incident on the phase-difference AF module 107. To let the subject light reflected off the secondary mirror 103b be incident precisely on the phase-difference AF module 107, a stopper (positioning member) Sb that abuts the secondary mirror 103b in the mirror-down attitude Pa to position the secondary mirror 103b in the mirror-down attitude Pa is disposed in the mirror box 103. Similarly, a stopper Sa for positioning the primary mirror holder 1031 in the mirror-down attitude Pa is also provided and fixed to the mirror box 103.

Figure 4:
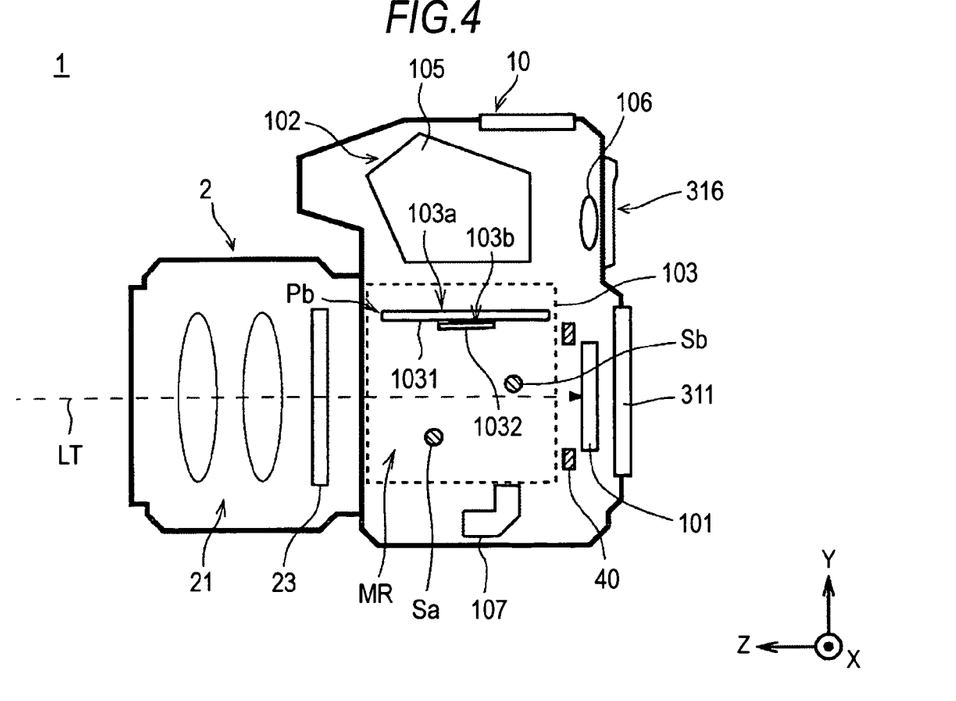
FIG. 4 explains a mirror-up attitude Pb of a mirror unit MR.

The mirror unit MR functions as what is called a quick-return mirror used to switch the optical path in the imaging apparatus 1. The mirror unit MR can take an attitude Pb during exposure (when a final image is captured) in which the mirror unit MR is retracted in an upper portion of the mirror box 103 (hereinafter sometimes referred to as a "mirror-up attitude"), as shown in FIG. 4. In this attitude, the secondary mirror 103b collapses so that it is substantially parallel to the primary mirror 103a. When the mirror unit MR changes its attitude from the mirror-down attitude Pa (see FIG. 3) to the mirror-up attitude Pb, a four-node link mechanism allows the mirror unit MR to swing back (which will be described later in detail), as in a known technology (the technology disclosed in JP-A-58-126522, for example). The mirror-up attitude Pb allows the subject light having passed through the interchangeable lens 2 not to be blocked by the mirror unit MR but to reach the imaging device 101, and the imaging device 101 is exposed to the subject light. When the imaging action in the imaging device 101 is completed, the mirror unit MR returns to its original position (the mirror-down attitude Pa shown in FIG. 3).

When the mirror unit MR takes the mirror-up attitude Pb shown in FIG. 4 before a final image is captured (before an image to be recorded is captured), the imaging apparatus 1 can operate in a live-view (preview) display mode in which the subject is displayed on the LCD 311 in a video form based on image signals successively produced by the imaging device 101. That is, before a final image is captured, the imaging apparatus 1 offers a choice between an electronic finder in which the live-view display is available (live-view mode) and the optical finder to determine a composition of the subject. The switching between the electronic finder and the optical finder is carried out by operating a switch 85 shown in FIG. 2.

The phase-difference AF module 107 functions as a focus detection sensor for detecting a state in which the subject is in focus when the AF module 107 receives the subject light reflected off the secondary mirror 103b in the mirror-down attitude Pa. The phase-difference AF module 107 is disposed below the mirror box 103, and detects the focus position based on phase-difference focus detection (hereinafter sometimes referred to as "phase-difference AF").

A shutter unit 40 is disposed in front of the imaging device 101 in the optical axis direction. The shutter unit 40 is configured as a mechanical focal-plane shutter including a vertically moving screen and opening and closing the screen to open and close the optical path along which the subject light is guided to the imaging device 101 along the optical axis LT. The shutter unit 40 can be omitted when the imaging device 101 has a fully electronic shutter capability.

The action of the mirror unit MR in the thus configured mirror box 103 will be described below in detail.

Action of Mirror Unit MR

Figure 5:
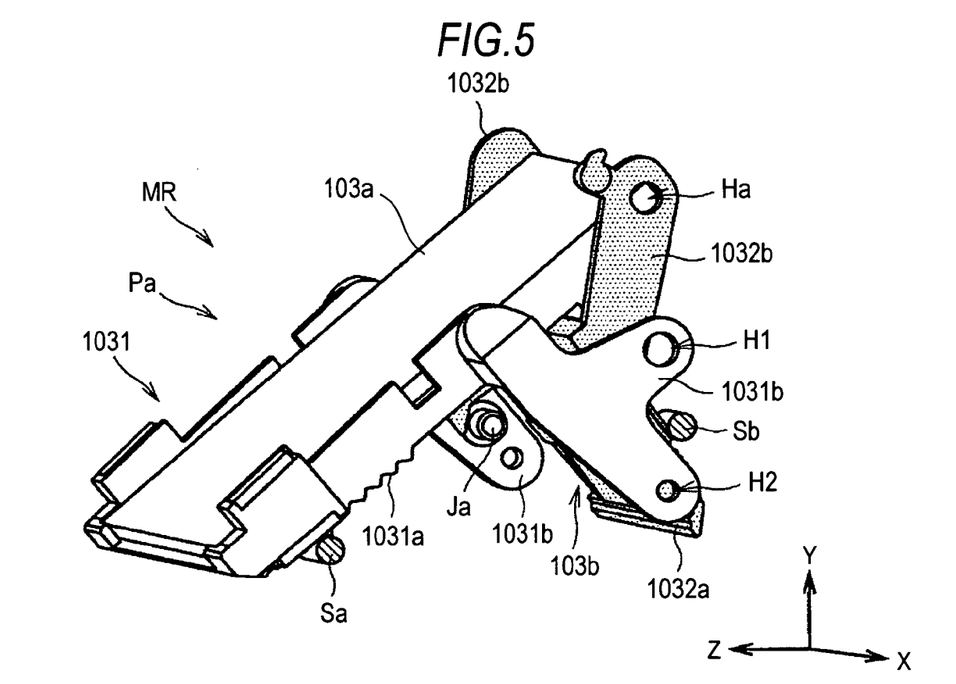
FIG. 5 is a perspective view explaining the mirror unit MR in a mirror-down attitude Pa.
Figure 6:
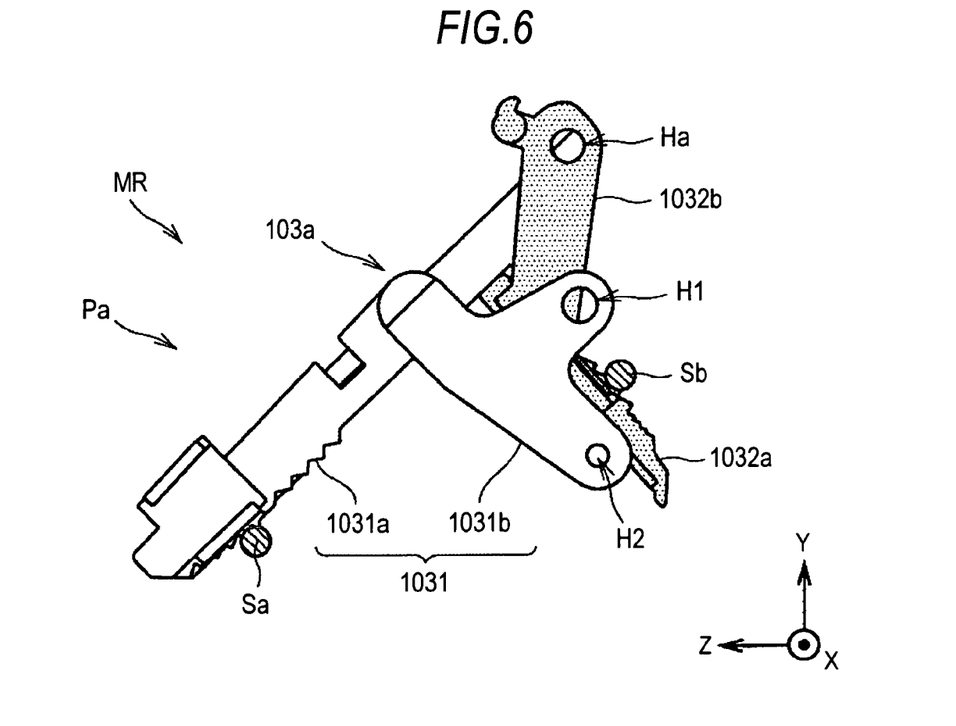
FIG. 6 is a side view explaining the mirror unit MR in the mirror-down attitude Pa.
Figure 7:
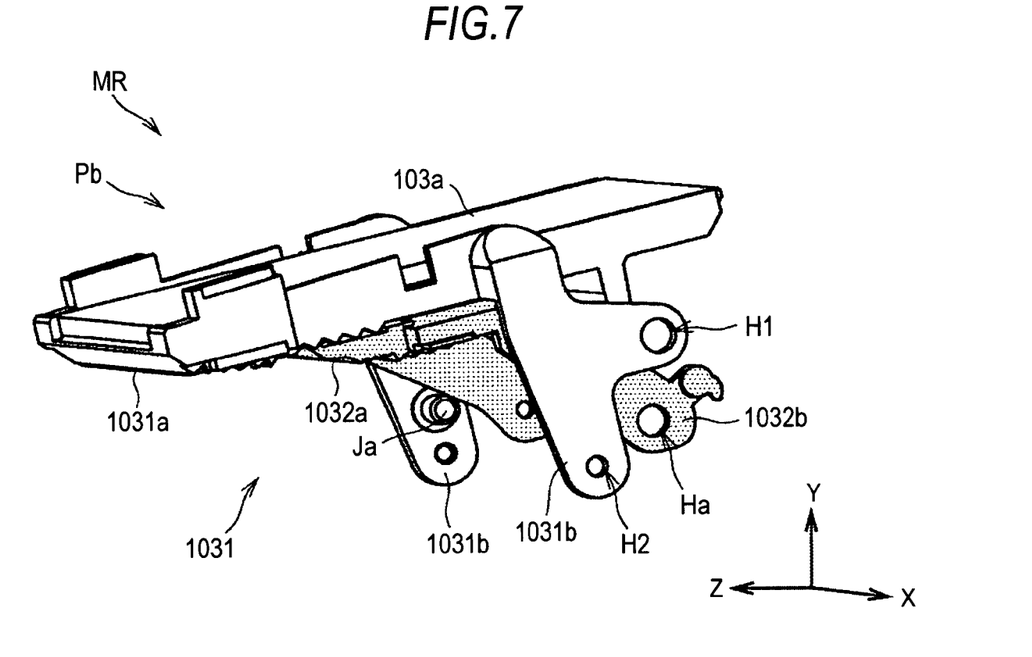
FIG. 7 is a perspective view explaining the mirror unit MR in a mirror-up attitude Pb.
Figure 8:
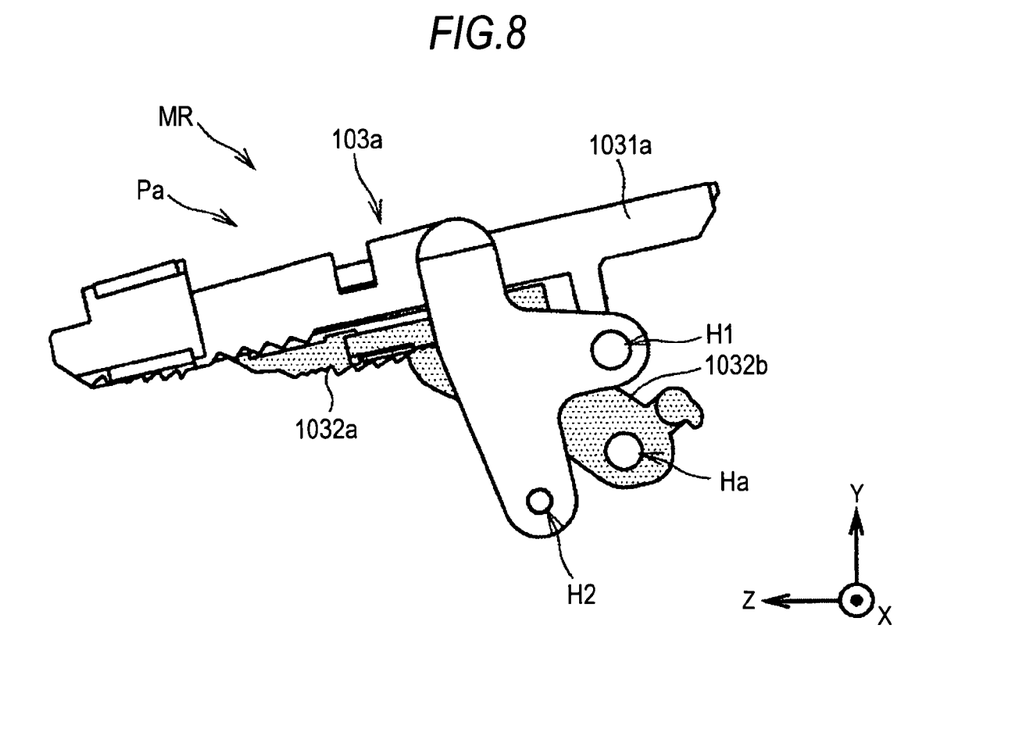
FIG. 8 is a side view explaining the mirror unit MR in the mirror-up attitude Pb.
Figure 9:
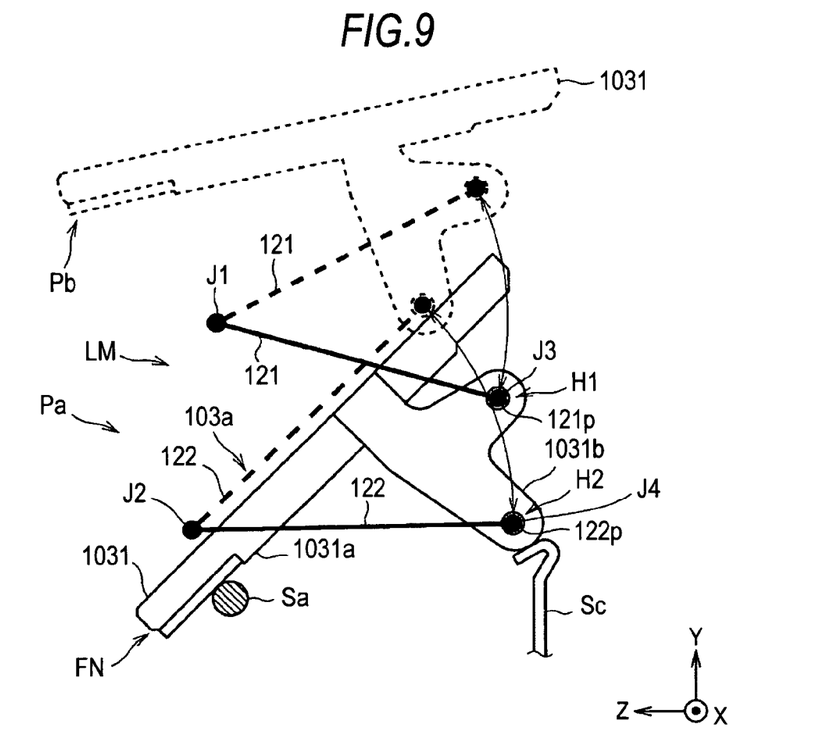
FIG. 9 explains how a primary mirror holder 1031 goes up and down.

FIGS. 5 and 6 are a perspective view and a side view, respectively, explaining the mirror unit MR in the mirror-down attitude Pa. FIGS. 7 and 8 are a perspective view and a side view, respectively, explaining the mirror unit MR in the mirror-up attitude Pb. FIG. 9 explains how the primary mirror holder 1031 goes up and down. FIGS. 5 and 6 show not only the mirror unit MR but also the stoppers Sa and Sb that abut the primary mirror holder 1031 and the secondary mirror holder 1032, respectively, in the mirror-down attitude Pa. FIG. 9 shows not only the mirror unit MR but also the stopper Sa that abuts a front portion of the primary mirror holder 1031 and a stopper Sc that abuts a rear portion of the primary mirror holder 1031.

The mirror unit MR includes the primary mirror holder 1031 and the secondary mirror holder 1032 (shaded in FIGS. 5 to 8), as described above. Drive arms 121 and auxiliary arms 122 are pivotally connected to the sides of the primary mirror holder 1031, each of the drive arms 121 and the auxiliary arms 122 pivotable around supporting points J1 and J2 fixed to the mirror box 103 (around the X-axis), as shown in FIG. 9. In FIG. 9, the drive arm 121 and the auxiliary arm 122 on one side are shown in a simplified form.

The primary mirror holder 1031 includes a body 1031a that holds the primary mirror 103a and two y-shaped arms 1031b connected to the sides of the body 1031a.

Each of the two arms 1031b branches into two ends, and circular holes H1 and H2 are formed at the two ends. When pins 121p and 122p (the filled circles in FIG. 9) provided at ends of the drive arm 121 and the auxiliary arm 122 on one side fit in the holds H1 and H2, respectively, the primary mirror holder 1031 can pivot around pivotal axes J3 and J4 (FIG. 9).

The drive arm 121 and the auxiliary arm 122 thus pivotally connected to the holes H1 and H2 in the primary mirror holder 1031 form a four-node link mechanism LM including the four pivotal axes J1 to J4. When the four-node link mechanism LM drives the primary mirror holder 1031 between the mirror-down attitude Pa and the mirror-up attitude Pb (indicated by the broken lines) as shown in FIG. 9, the path of the front end FN of the primary mirror holder 1031 does not protrude toward the interchangeable lens 2 or interfere with the rear-end lens of the interchangeable lens 2, that is, the primary mirror holder 1031 can swing back.

On the other hand, the mirror box 103 includes the stopper Sa that abuts a portion in the vicinity of the front end FN of the primary mirror holder 1031 and the stopper Sc that abuts a portion in the vicinity of an end of one of the arms 1031b connected to the primary mirror holder 1031, each of the stopper Sa and the stopper Sc serving as a member that restricts the four-node link mechanism LM to position the primary mirror holder 1031, for example, in the mirror-down attitude Pa in which the primary mirror 103a is inclined to the vertical direction by 45 degrees.

The secondary mirror holder 1032 serves as a movable unit with the secondary mirror 103b provided therein, and includes a body 1032a that holds the secondary mirror 103b and two arms 1032b connected to the sides of the body 1032a.

Each of the two arms 1032b has an end in which a hole Ha is formed. The secondary mirror holder 1032 can pivot around the X-axis using the two holes Ha as the supporting points. The thus configured drive mechanism for driving the secondary mirror holder 1032 can change the attitude of the secondary mirror holder 1032 between the mirror-down attitude Pa shown in FIGS. 5 and 6 and the mirror-up attitude Pb shown in FIGS. 7 and 8 in synchronization with the change in the attitude of the primary mirror holder 1031 driven by the drive arms 121.

Specifically, when a secondary mirror link shaft (hereinafter abbreviated to a "link shaft") Ja protruding inward from one of the arms 1031b of the primary mirror holder 1031 comes into contact with an edge of the secondary mirror holder 1032 to lift the secondary mirror holder 1032, the attitude of the secondary mirror holder 1032 can be changed from the mirror-down attitude Pa to the mirror-up attitude Pb (which will be described later in detail). On the other hand, when the attitude of the secondary mirror holder 1032 is changed from the mirror-up attitude Pb to the mirror-down attitude Pa, the secondary mirror holder 1032 abuts the cylindrical stopper Sb to allow the secondary mirror 103b to be inclined to the vertical direction by a predetermined angle (45 degrees, for example), as shown in FIG. 5.

Figure 10:
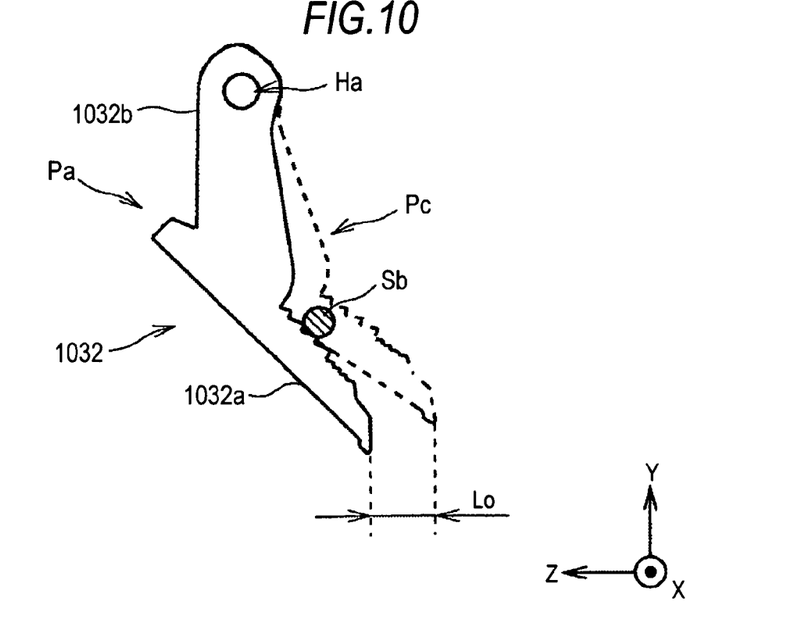
FIG. 10 explains deformation produced when a secondary mirror holder 1032 hits a stopper Sb.

In the mirror-down action, the stopper Sb hits one side of the secondary mirror holder 1032. Therefore, the body 1032a of the secondary mirror holder 1032, which has a certain width and a certain level of elasticity in the X-axis direction, deforms on the other side of the secondary mirror holder 1032 with which the stopper Sb does not come into contact. As a result, the other side of the secondary mirror holder 1032 with which the stopper Sb does not come into contact may disadvantageously deform, for example, to a position Pc (indicated by the broken line) spaced apart from the mirror-down attitude Pa backward (in the −Z direction) by a distance Lo, as shown in FIG. 10, possibly causing the secondary mirror 103b to vibrate (bound) at a small amplitude.

Such small vibration of the secondary mirror 103b causes the subject light reflected off the secondary mirror 10b to sway. Therefore, the subject light is not precisely incident on the phase-difference AF module 107, which makes it difficult for the phase-difference AF module 107 to detect the focus. In particular, when images are continuously captured, capturing an image of the frame following the current frame may not be initiated unless the phase-difference AF module 107 completes its focus detection process. Therefore, if the vibration of the secondary mirror 103b lasts long, the continuous imaging speed disadvantageously decreases.

How to prevent such problematic small vibration of the secondary mirror 103b will be described below.

How to Prevent Secondary Mirror 103b from Vibrating

Figure 11:
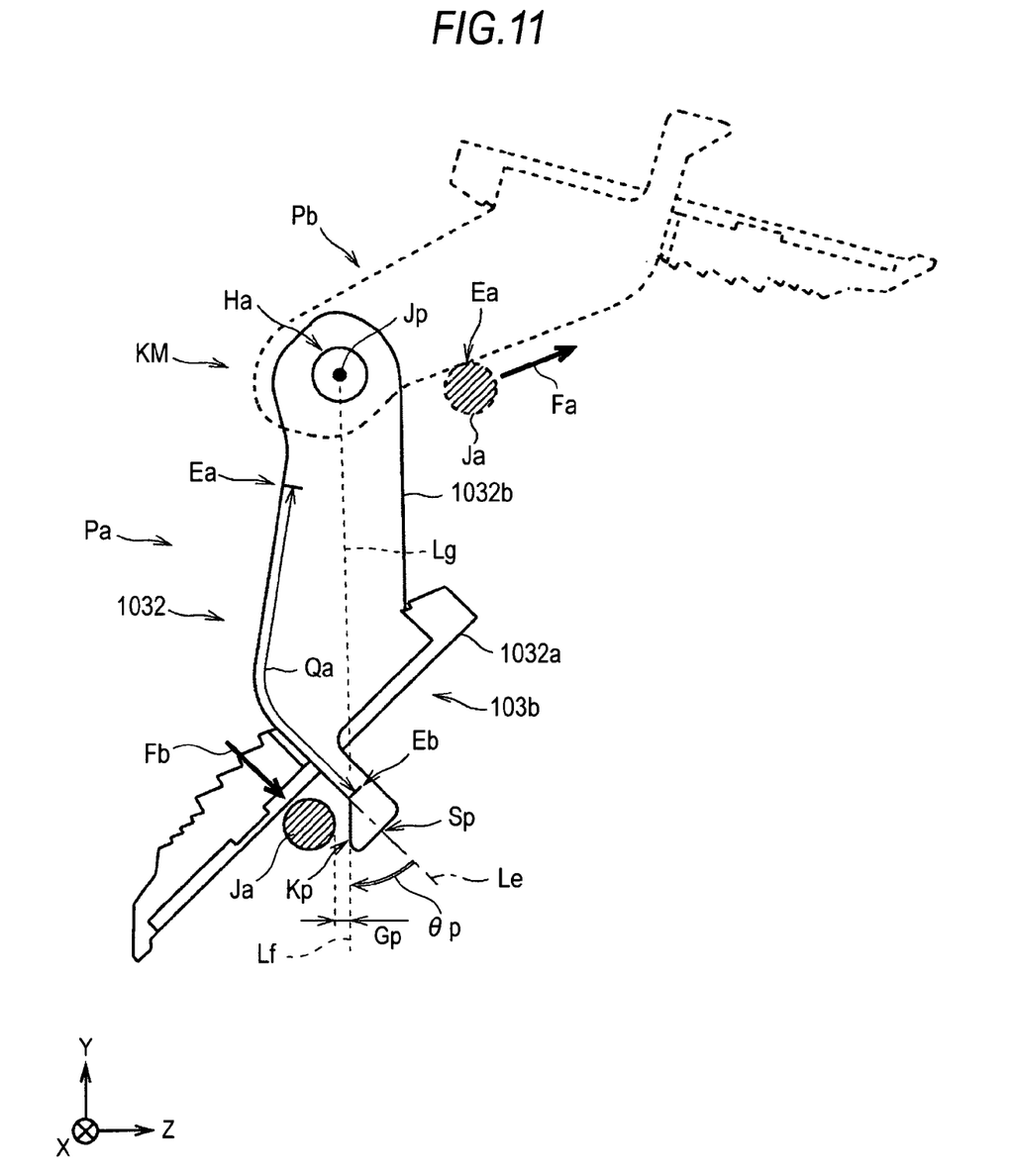
FIG. 11 explains how to prevent a secondary mirror 103b from vibrating.

FIG. 11 explains how to prevent the secondary mirror 103b from vibrating. FIG. 11 is a side view when the secondary mirror holder 1032 is viewed from the side where the stopper Sb is not disposed.

Before how to prevent the secondary mirror 103b from vibrating is described, the drive mechanism for driving the secondary mirror holder 1032 will be described.

The mirror box 103 includes a drive mechanism KM that pivots around a central axis (pivotal axis) Jp of the hole Ha to switch the attitude of the secondary mirror holder 1032 from the mirror-up attitude (first attitude) Pb to the mirror-down attitude (second attitude) Pa. In the drive mechanism KM, when the link shaft Ja fixed to the primary mirror holder 1031 relatively moves along a guiding section Qa defined by an edge (outer side surface) of the secondary mirror holder 1032 from a start point Ea to an endpoint Eb, the attitude of the secondary mirror holder 1032 is switched from the mirror-up attitude Pb to the mirror-down attitude Pa.

Specifically, in the secondary mirror holder 1032, when it takes the mirror-up attitude Pb (indicated by the broken line), the link shaft Ja abuts the start point Ea of the guiding section Qa, and when the mirror starts going down, the link shaft Ja relatively moves toward the end point Eb of the guiding section Qa, that is, in the direction indicated by the arrow Fa. When the mirror-down action is almost completed, the link shaft Ja relatively moves toward the end point Eb of the guiding section Qa in the direction indicated by the arrow Fb, and when the mirror-down action is completed, the link shaft Ja reaches the end point Eb of the guiding section Qa.

How to prevent the secondary mirror holder 1032 acting this way from vibrating will now be described.

The secondary mirror holder 1032 of the present embodiment has a stopper Sp provided at a portion beyond the guiding section Qa on which the link shaft Ja slides in the mirror-down action, the stopper Sp preventing the secondary mirror holder 1032 from deforming in the manner described in FIG. 10.

The stopper Sp is a protrusion that protrudes from an extension line Le (indicated by the phantom line) toward the link shaft Ja in the secondary mirror holder 1032 in the mirror-down attitude Pa, the extension line Le obtained by extending the guiding section Qa beyond the end point Eb. The stopper Sp has an edge Kp formed along a line Lf obtained by inclining the extension line Le, which extends tangentially to the guiding section Qa in the vicinity of the end point Eb, toward the link shaft Ja by a predetermined angle $\theta p$ (45 degrees, for example). In other words, the edge Kp of the stopper Sp is formed along a line Lg extending from the pivotal axis Jp toward the end point Eb of the guiding section Qa. The thus formed stopper Sp with the edge Kp allows the link shaft Ja to relatively approach the edge Kp (the contour of the edge Kp)

in a substantially vertical direction and come into contact therewith even when the secondary mirror holder 1032 deforms at the time of completion of the mirror-down action, whereby the link shaft Ja comes into contact with the edge Kp appropriately.

The edge Kp is preferably formed in such a way that there is a fixed clearance Gp between the edge Kp and the link shaft Ja in the secondary mirror holder 1032 in the mirror-down attitude Pa. In other words, there is a predetermined clearance Gp between the link shaft Ja and the stopper Sp when the stopper Sb (FIG. 5) positions the secondary mirror holder 1032 in the mirror-down attitude Pa. The reason for this is that if the stopper Sp comes into contact with the link shaft Ja in the mirror-down attitude Pa, the secondary mirror holder 1032 may not be positioned precisely by the stopper Sb.

A description will be made of how the thus configured stopper Sp of the secondary mirror holder 1032 advantageously prevents the secondary mirror 103*b* from vibrating.

Figure 12:
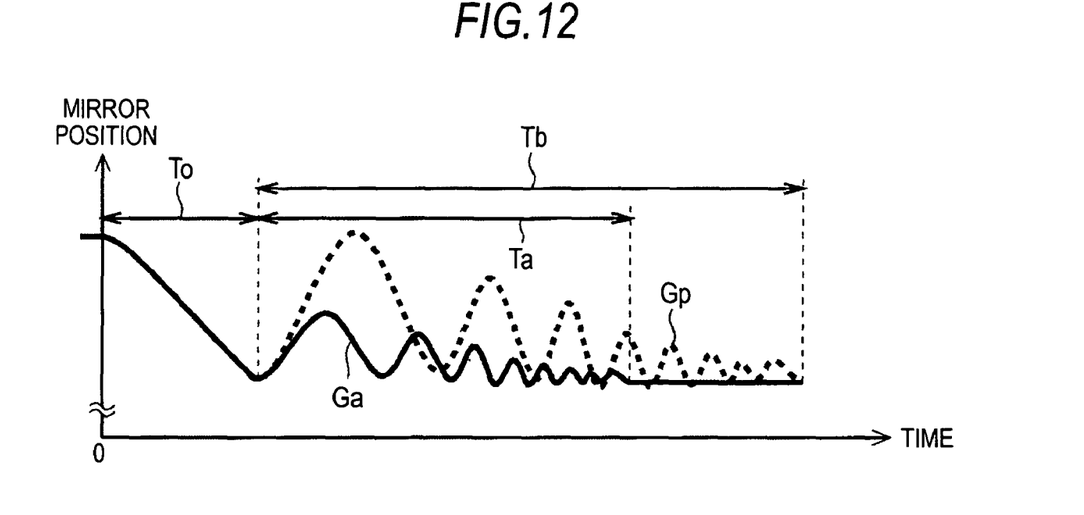
FIG. 12 explains how a stopper Sp advantageously prevents the secondary mirror 103b from vibrating.

FIG. 12 explains how the stopper Sp advantageously prevents the secondary mirror 103*b* from vibrating. In FIG. 12, the horizontal axis represents the time that has elapsed since the mirror-down action was initiated, and the vertical axis represents the position of the secondary mirror 103*b* (greater vertical coordinates represent higher positions). The graph Ga (indicated by the solid line) represents the behavior of the secondary mirror 103*b* according to the present embodiment, whereas the graph Gb (indicated by the broken line) represents the behavior of the secondary mirror 103*b* according to related art in which no stopper Sp is provided.

After a mirror-down period To, in which the attitude of the secondary mirror 103*b* is changed from the mirror-up attitude Pb to the mirror-down attitude Pa, the secondary mirror holder 1032 hits the stopper Sb and hence starts vibrating. In the related art in which no stopper Sp is provided, it takes a long period Tb (hereinafter sometimes referred to as a "mirror stabilization period") until the vibrating secondary mirror 103*b* is stabilized, as indicated by the graph Gb.

In contrast, in the present embodiment, even when the side of the secondary mirror holder 1032 that does not come into contact with the stopper Sb deforms when the mirror-down action is completed, the stopper Sp restricts the amount of deformation of the secondary mirror holder 1032 within the clearance Gp between the edge Kp and the link shaft Ja shown in FIG. 11. The deformation of the secondary mirror holder 1032 is therefore reduced, whereby the vibration due to the deformation is suppressed. As a result, the mirror stabilization period Ta of the secondary mirror 103*b* can be much shorter than that in the related art, as indicated by the graph Ga.

That is, in the mirror box 103 of the present embodiment, the secondary mirror holder 1032 has the stopper Sp that comes into contact with the link shaft Ja of the primary mirror holder 1031 when the mirror-down action is completed. The vibration of the secondary mirror 103*b* due to the deformation of the secondary mirror holder 1032 produced when the secondary mirror 103*b* is driven and positioned in the mirror-down attitude Pa can therefore be quickly attenuated. Further, since the link shaft Ja necessary to lift and lower the secondary mirror holder 1032 also serves as the member that comes into contact with the stopper Sp, it is possible to prevent the secondary mirror 103*b* from vibrating in a simple configuration.

Variations

Figure 13:
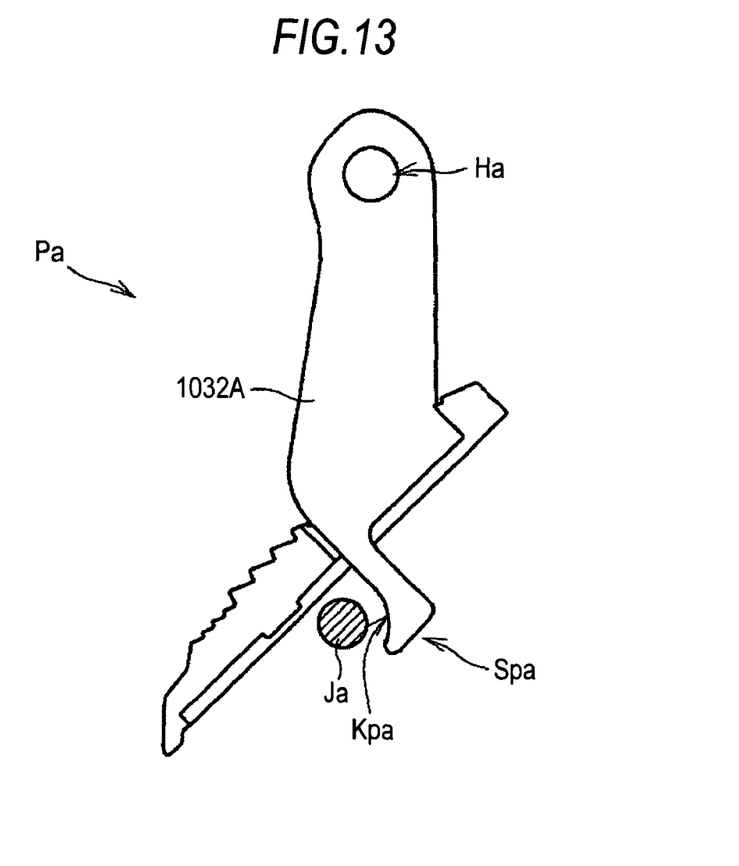
FIG. 13 explains a secondary mirror holder 1032A provided with a stopper Spa according to a variation of the invention.
Figure 14:
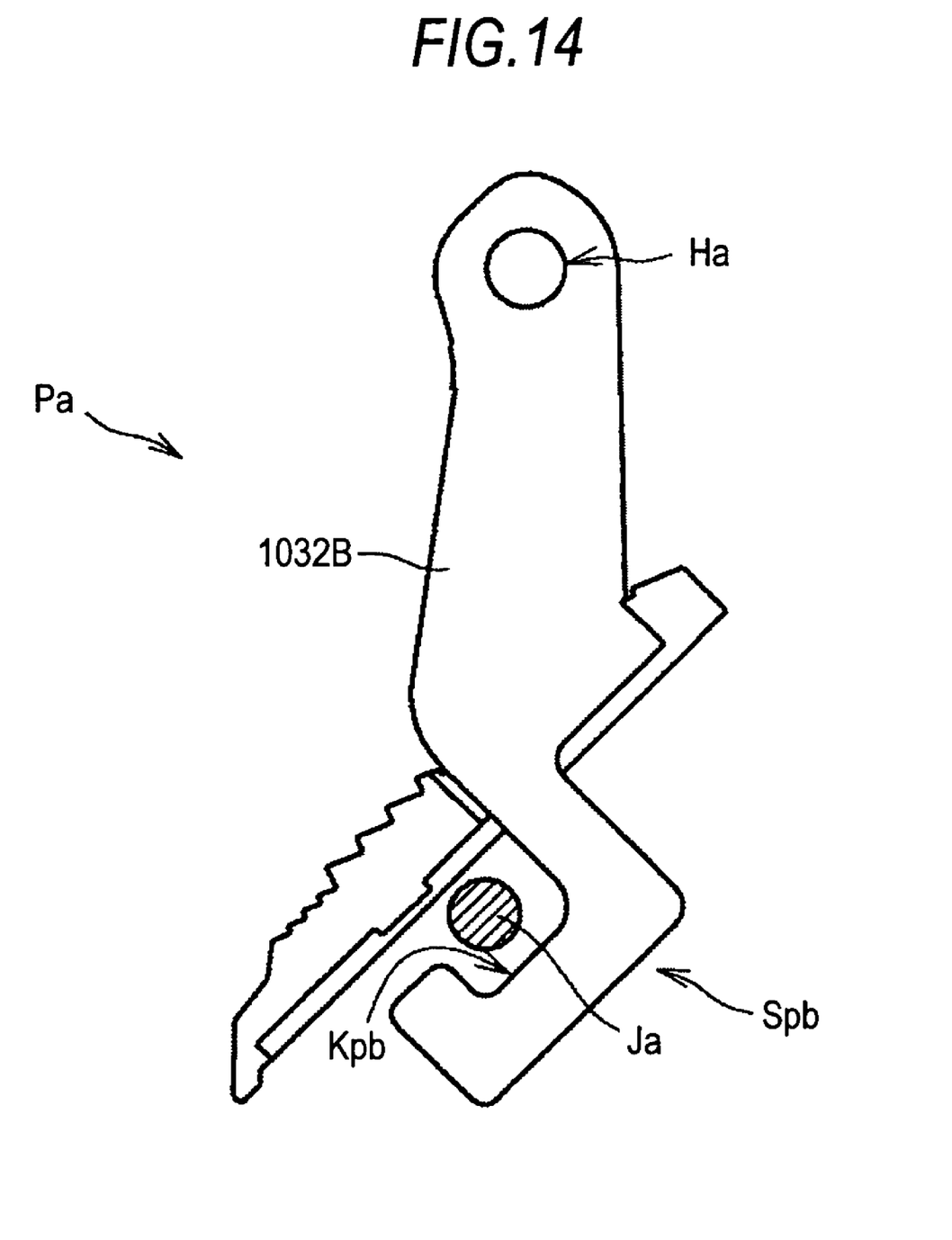
FIG. 14 explains a secondary mirror holder 1032B provided with a stopper Spb according to another variation of the invention.

In the embodiment described above, the secondary mirror holder 1032 provided with the stopper Sp having the shape shown in FIG. 11 is not necessarily employed, but a secondary mirror holder provided with a stopper having a different shape may be employed. For example, a secondary mirror holder 1032A provided with a stopper Spa having an arcuate edge Kpa shown in FIG. 13 or a secondary mirror holder 1032B provided with a stopper Spb having a "U-shaped" edge Kpb shown in FIG. 14 may be employed. In these cases as well, the same advantageous effect as that provided in the embodiment described above can be provided.

In the embodiment described above, the mirror box 103 is not necessarily provided in a digital camera, but may be provided in a silver halide camera (film camera).

The present application contains subject matter related to that disclosed in Japanese Priority Patent Application JP 2008-140852 filed in the Japan Patent Office on May 29, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A mirror drive apparatus comprising:
   a movable unit including a mirror assembly used to switch into and out of an optical path in an imaging apparatus, the mirror assembly including a primary mirror and a secondary mirror; and
   a drive mechanism that switches the attitude of the movable unit from a first attitude to a second attitude by relatively moving a specific member along a predetermined section defined by an edge of the movable unit from a start point to an end point of the predetermined section,
   wherein the movable unit includes a protrusion that protrudes from an extension line toward the specific member, the extension line obtained by extending the predetermined section beyond the end point and
   wherein, in the first attitude, the primary mirror and the secondary mirror generally facially oppose and extend approximately parallel to each other with the mirror assembly positioned out of the optical path and, in the second attitude, the primary mirror and the secondary mirror are oriented perpendicularly relative to one another with the mirror assembly positioned in the optical path.

2. The mirror drive apparatus according to claim 1,
   further comprising a positioning member that abuts the movable unit in the second attitude to position the movable unit in the second attitude,
   wherein the specific member is spaced apart from the protrusion by a predetermined clearance when the positioning member positions the movable unit in the second attitude.

3. The mirror drive apparatus according to claim 1,
   wherein the protrusion has an edge extending along a line obtained by inclining the extension line toward the specific member by approximately 45 degrees.

4. The mirror drive apparatus according to claim 1,
   wherein the drive mechanism switches the attitude of the movable unit from the first attitude to the second attitude by pivoting the movable unit around a predetermined pivotal axis, and
   the protrusion has an edge along a line extending from the predetermined pivotal axis toward the end point of the predetermined section.

5. An imaging apparatus comprising:
   a movable unit including a mirror assembly used to switch into an out of an optical path, the mirror assembly including a primary mirror and a secondary mirror; and a drive mechanism that switches the attitude of the movable unit from a first attitude to a second attitude by relatively moving a specific member along a predetermined section defined by an edge of the movable unit from a start point to an end point of the predetermined section, wherein the movable unit includes a protrusion that protrudes from an extension line toward the specific member, the extension line obtained by extending the predetermined section beyond the end point and wherein, in the first attitude, the primary mirror and the secondary mirror generally facially oppose and extend approximately parallel to each other with the mirror assembly positioned out of the optical path and, in the second attitude, the primary mirror and the secondary mirror are oriented perpendicularly relative to one another with the mirror assembly positioned in the optical path.

* * * * *